(12) United States Patent
Hillesund et al.

(10) Patent No.: US 8,792,297 B2
(45) Date of Patent: Jul. 29, 2014

(54) METHODS FOR GATHERING MARINE GEOPHYSICAL DATA

(75) Inventors: Øyvind Hillesund, Nesbru (NO); Stian Hegna, Hovik (NO)

(73) Assignee: PGS Geophysical AS, Oslo (NO)

(*) Notice: Subject to any disclaimer, the term of this patent is extended or adjusted under 35 U.S.C. 154(b) by 511 days.

(21) Appl. No.: 12/803,730

(22) Filed: Jul. 2, 2010

(65) Prior Publication Data

US 2012/0002502 A1    Jan. 5, 2012

(51) Int. Cl.
*G01V 1/38* (2006.01)

(52) U.S. Cl.
CPC .................................. *G01V 1/3808* (2013.01)
USPC ............................................... 367/19; 367/16

(58) Field of Classification Search
USPC ........................................ 367/16–19; 114/244
See application file for complete search history.

(56) References Cited

U.S. PATENT DOCUMENTS

| | | |
|---|---|---|
| 3,375,800 A | 4/1968 | Cole et al. |
| 3,412,704 A | 11/1968 | Buller et al. |
| 3,412,705 A | 11/1968 | Nesson |
| 3,434,446 A | 3/1969 | Cole |
| 3,440,992 A | 4/1969 | Chance |
| 3,531,761 A | 9/1970 | Tickell et al. |
| 3,531,762 A | 9/1970 | Tickell |
| 3,560,912 A | 2/1971 | Spink et al. |
| 3,605,674 A | 9/1971 | Weese |
| 3,618,555 A | 11/1971 | Kelly et al. |
| 3,648,642 A | 3/1972 | Fetrow et al. |
| 3,774,570 A | 11/1973 | Pearson |
| 3,840,845 A | 10/1974 | Brown |
| 3,896,756 A | 7/1975 | Pearson et al. |
| 3,921,124 A | 11/1975 | Payton |
| 3,931,608 A | 1/1976 | Cole |
| 3,943,483 A | 3/1976 | Strange |
| 3,961,303 A | 6/1976 | Paitson |
| 4,033,278 A | 7/1977 | Waters |
| 4,055,138 A | 10/1977 | Klein |
| 4,063,213 A | 12/1977 | Itria et al. |
| 4,087,780 A | 5/1978 | Itria et al. |
| 4,144,518 A | 3/1979 | Minohara et al. |
| 4,222,340 A | 9/1980 | Cole |
| 4,227,479 A | 10/1980 | Gertler et al. |

(Continued)

FOREIGN PATENT DOCUMENTS

| | | |
|---|---|---|
| AU | 199853305 | 6/2001 |
| AU | 2002315000 | 1/2003 |

(Continued)

OTHER PUBLICATIONS

L.I. Popova, Eurasian Patent Search Report, Mailing Date: Jan. 18, 2012.

(Continued)

*Primary Examiner* — Ian J Lobo

(57) ABSTRACT

In a first embodiment the invention comprises a method for gathering geophysical data, including towing geophysical data gathering equipment behind a survey vessel in a body of water, said equipment including an array of sensor streamers extending behind said vessel, and determining a geodetic location of a streamer steering reference point at a forward end of the sensor streamers and a reference direction. At least one sensor streamer included in said array of sensor streamers is laterally deflected in response to the determined geodetic location of said streamer steering reference point and the determined reference direction.

15 Claims, 4 Drawing Sheets

(56) References Cited

U.S. PATENT DOCUMENTS

| | | |
|---|---|---|
| 4,290,124 A | 9/1981 | Cole |
| 4,313,392 A | 2/1982 | Guenther et al. |
| 4,323,989 A | 4/1982 | Huckabee et al. |
| 4,404,664 A | 9/1983 | Zachariadis |
| 4,463,701 A | 8/1984 | Pickett et al. |
| 4,484,534 A | 11/1984 | Thillaye du Boullay |
| 4,486,863 A | 12/1984 | French |
| 4,676,183 A | 6/1987 | Conboy |
| 4,694,435 A | 9/1987 | Magneville |
| 4,709,355 A | 11/1987 | Woods et al. |
| 4,711,194 A | 12/1987 | Fowler |
| 4,719,987 A | 1/1988 | George, Jr. et al. |
| 4,723,501 A | 2/1988 | Hovden et al. |
| 4,724,788 A | 2/1988 | Ayers |
| 4,729,333 A | 3/1988 | Kirby et al. |
| 4,743,996 A | 5/1988 | Book |
| 4,745,583 A | 5/1988 | Motal |
| 4,766,441 A | 8/1988 | Phillips et al. |
| 4,767,183 A | 8/1988 | Martin |
| 4,798,156 A | 1/1989 | Langeland et al. |
| 4,825,708 A | 5/1989 | Sevick |
| 4,843,996 A | 7/1989 | Darche |
| 4,890,568 A | 1/1990 | Dolengowski |
| 4,890,569 A | 1/1990 | Givens |
| 4,912,684 A | 3/1990 | Fowler |
| 4,992,990 A | 2/1991 | Langeland et al. |
| 5,031,159 A | 7/1991 | Rouquette |
| 5,042,413 A | 8/1991 | Benoit |
| 5,050,133 A | 9/1991 | Buddery |
| 5,052,814 A | 10/1991 | Stubblefield |
| 5,117,400 A | 5/1992 | Penn et al. |
| 5,138,582 A | 8/1992 | Furu |
| 5,148,406 A | 9/1992 | Brink et al. |
| 5,200,930 A | 4/1993 | Rouquette |
| 5,214,612 A | 5/1993 | Olivier et al. |
| 5,402,745 A | 4/1995 | Wood |
| 5,443,027 A | 8/1995 | Owsley et al. |
| 5,507,243 A | 4/1996 | Williams, Jr. et al. |
| 5,517,202 A | 5/1996 | Patel et al. |
| 5,517,463 A | 5/1996 | Hornbostel et al. |
| 5,529,011 A | 6/1996 | Williams, Jr. |
| 5,532,975 A | 7/1996 | Elholm |
| 5,546,882 A | 8/1996 | Kuche |
| 5,619,474 A | 4/1997 | Kuche |
| 5,642,330 A | 6/1997 | Santopietro |
| 5,668,775 A | 9/1997 | Hatteland |
| 5,761,153 A | 6/1998 | Gikas et al. |
| 5,771,202 A | 6/1998 | Bale et al. |
| 5,784,335 A | 7/1998 | Deplante et al. |
| 5,790,472 A | 8/1998 | Workman et al. |
| 5,835,450 A | 11/1998 | Russell |
| 5,913,280 A | 6/1999 | Nielsen et al. |
| 5,920,828 A | 7/1999 | Norris et al. |
| 5,973,995 A | 10/1999 | Walker et al. |
| 6,011,752 A | 1/2000 | Ambs et al. |
| 6,011,753 A | 1/2000 | Chien |
| 6,016,286 A | 1/2000 | Olivier et al. |
| 6,028,817 A | 2/2000 | Ambs |
| 6,049,507 A | 4/2000 | Allen |
| 6,091,670 A | 7/2000 | Oliver et al. |
| 6,142,091 A | 11/2000 | Henriksen |
| 6,144,342 A | 11/2000 | Bertheas et al. |
| 6,229,760 B1 | 5/2001 | Ambs |
| 6,418,378 B1 | 7/2002 | Nyland |
| 6,459,653 B1 | 10/2002 | Kuche |
| 6,525,992 B1 | 2/2003 | Olivier et al. |
| 6,549,653 B1 | 4/2003 | Osawa et al. |
| 6,618,321 B2 | 9/2003 | Brunet |
| 6,671,223 B2 | 12/2003 | Bittleston |
| 6,691,038 B2 | 2/2004 | Zajac |
| 6,766,253 B2 | 7/2004 | Burns et al. |
| 6,879,542 B2 | 4/2005 | Soreau et al. |
| 6,932,017 B1 | 8/2005 | Hillesund et al. |
| 7,080,607 B2 | 7/2006 | Hillesund et al. |
| 7,092,315 B2 | 8/2006 | Olivier |
| 7,161,871 B2 | 1/2007 | Brunet |
| 7,162,967 B2 | 1/2007 | Hillesund et al. |
| 7,176,589 B2 | 2/2007 | Rouquette |
| 7,190,634 B2 | 3/2007 | Lambert et al. |
| 7,203,130 B1 * | 4/2007 | Welker ............................ 367/16 |
| 7,221,620 B2 | 5/2007 | Planke et al. |
| 7,222,579 B2 | 5/2007 | Hillesund et al. |
| 7,267,070 B2 | 9/2007 | Le Page et al. |
| 7,293,520 B2 | 11/2007 | Hillesund et al. |
| 7,377,224 B2 | 5/2008 | Ryan et al. |
| 7,391,674 B2 | 6/2008 | Welker |
| 7,403,448 B2 | 7/2008 | Welker et al. |
| 7,415,936 B2 | 8/2008 | Storteig et al. |
| 7,417,924 B2 | 8/2008 | Vigen et al. |
| 7,423,929 B1 | 9/2008 | Olivier |
| 7,433,264 B2 * | 10/2008 | Vigen ............................ 367/16 |
| 8,230,801 B2 | 7/2012 | Hillesund et al. |
| 8,267,031 B2 * | 9/2012 | Austad et al. .................. 114/244 |
| 2005/0188908 A1 | 9/2005 | Hillesund et al. |
| 2006/0227658 A1 | 10/2006 | Toennessen et al. |
| 2006/0231006 A1 | 10/2006 | Hillesund et al. |
| 2006/0231007 A1 | 10/2006 | Hillesund et al. |
| 2006/0256653 A1 | 11/2006 | Toennessen et al. |
| 2006/0260529 A1 | 11/2006 | Hillesund et al. |
| 2007/0019504 A1 | 1/2007 | Howlid et al. |
| 2007/0041272 A1 | 2/2007 | Hillesund et al. |
| 2007/0064526 A1 | 3/2007 | Holo |
| 2007/0127312 A1 | 6/2007 | Storteig et al. |
| 2007/0165486 A1 | 7/2007 | Moldoveanu et al. |
| 2007/0223307 A1 | 9/2007 | Storteig et al. |
| 2007/0223308 A1 | 9/2007 | Frivik et al. |
| 2008/0008033 A1 | 1/2008 | Fossum et al. |
| 2008/0262738 A1 | 10/2008 | Welker |
| 2008/0304358 A1 | 12/2008 | Mellier et al. |
| 2008/0316859 A1 | 12/2008 | Welker et al. |
| 2009/0003129 A1 | 1/2009 | Stokkeland et al. |
| 2009/0003135 A1 | 1/2009 | Mellier et al. |
| 2009/0030605 A1 | 1/2009 | Breed |
| 2009/0141587 A1 | 6/2009 | Welker et al. |
| 2009/0211509 A1 | 8/2009 | Olivier et al. |
| 2009/0238035 A1 | 9/2009 | Hillesund et al. |
| 2009/0245019 A1 * | 10/2009 | Falkenberg et al. ............ 367/17 |
| 2009/0262601 A1 | 10/2009 | Hillesund et al. |
| 2009/0279385 A1 | 11/2009 | Hillesund et al. |
| 2010/0118644 A1 | 5/2010 | Seale et al. |
| 2010/0202249 A1 | 8/2010 | Goujon et al. |

FOREIGN PATENT DOCUMENTS

| | | |
|---|---|---|
| AU | 2003231620 | 9/2003 |
| AU | 2007201855 | 5/2007 |
| AU | 2008200247 | 2/2008 |
| AU | 2008200248 | 2/2008 |
| CA | 2270719 | 7/1998 |
| DE | 69702673 | 4/2001 |
| EP | 0018053 | 10/1980 |
| EP | 0154968 | 9/1985 |
| EP | 0193215 | 9/1986 |
| EP | 0297852 | 1/1989 |
| EP | 0319716 | 6/1989 |
| EP | 0321705 | 6/1989 |
| EP | 0390987 | 10/1990 |
| EP | 0525391 | 2/1993 |
| EP | 0562781 | 9/1993 |
| EP | 0581441 | 2/1994 |
| EP | 0613025 | 8/1994 |
| EP | 0909701 | 4/1999 |
| EP | 0939910 | 9/1999 |
| EP | 1119780 | 8/2001 |
| EP | 1417515 | 5/2004 |
| EP | 1847851 | 10/2007 |
| EP | 1847852 | 10/2007 |
| EP | 1847853 | 10/2007 |
| EP | 1868011 | 12/2007 |
| EP | 2128654 | 2/2009 |
| EP | 2090902 | 8/2009 |
| EP | 2090903 | 8/2009 |
| EP | 2090904 | 8/2009 |
| EP | 2128654 | 12/2009 |

(56) References Cited

FOREIGN PATENT DOCUMENTS

| | | |
|---|---|---|
| EP | 2209022 | 7/2010 |
| GB | 1088469 | 10/1967 |
| GB | 2093610 | 9/1982 |
| GB | 2122562 | 1/1984 |
| GB | 2320706 | 7/1998 |
| GB | 2331971 | 6/1999 |
| GB | 2342081 | 4/2000 |
| GB | 2364388 | 1/2002 |
| GB | 2 364 388 B | 8/2002 |
| GB | 2436456 | 9/2007 |
| NO | 992701 | 6/1999 |
| NO | 20074664 | 4/2001 |
| NO | 20074667 | 4/2001 |
| NO | 20074669 | 4/2001 |
| NO | 20074671 | 4/2001 |
| NO | 20074672 | 4/2001 |
| NO | 20035589 | 2/2004 |
| NO | 20074692 | 2/2004 |
| NO | 20074693 | 2/2004 |
| NO | 330507 | 5/2011 |
| RU | 13929 | 6/2000 |
| RU | 14681 | 8/2000 |
| RU | 13929 | 10/2000 |
| RU | 14681 | 10/2000 |
| RU | 31658 | 8/2003 |
| WO | 95/31735 | 11/1995 |
| WO | 96/21163 | 7/1996 |
| WO | 97/11395 | 3/1997 |
| WO | 97/30361 | 8/1997 |
| WO | 97/45006 | 12/1997 |
| WO | 98/28636 | 7/1998 |
| WO | 99/04293 | 1/1999 |
| WO | 00/20895 | 4/2000 |
| WO | 01/16623 | 3/2001 |
| WO | 02103393 | 12/2002 |

OTHER PUBLICATIONS

Matthias Meyer, Partial European Search Report, Mailing Date: Feb. 1, 2013.
Matthias Meyer, Extended European Search Report, Mailing Date: Mar. 27, 2013.
Levin, et al., "Developments in Exploration Geophysics," Geophysics, vol. 41, No. 2, Apr. 1976, pp. 209-218.
Eiken, et al., "A proven method for acquiring highly repeatable towed streamer seismic data," Geophysics, vol. 68, No. 4, Jul.-Aug. 2003, pp. 1303-1309.
Laster, "The present state of seismic data acquisition: One view," Geophysics, vol. 50, No. 12, Dec. 1985, pp. 2443-2451.
Schoenberger, et al., "Hydrophone Streamer Noise," Geophysics, vol. 39, No. 6, Dec. 1974, pp. 781-793.
Levin, "Short Note: The effect of binning on data from a feathered streamer," Geophysics, vol. 49, No. 8, Aug. 1984, pp. 1386-1387.
Austad, et al., "Marine Seismic Cable Steering and Computerized Control Systems," SEG 2000 Expanded Abstracts, 3 pages. [Downloaded Oct. 27, 2012 to 98.195.208.113].
Cole, et al., "Three-Dimensional Marine Seismic Data Acquisition Using Controlled Streamer Feathering," MAR 3.5, Tensor Geophysical Service Corp., 1983, pp. 293-295. [Downloaded Oct. 27, 2012 to 98.195.208.113].
Helgaker, et al., "Marine 3-D Acquisition Using Two Parallel Streamers," S4.5, GECO A. S., Norway, 1986, pp. 383-385.
Canter, et al., "Evolution of Positioning in Marine 3-D Seismic," Seismic Acquisition 1: 3-D Acquisition-Wednesday Morning, SA 1.1, 1989, pp. 606-609. [Downloaded Oct. 27, 2012 to 98.195.208.113].
Bordenave, et al, "Prediction in Infill Requirements by Simulation of 3D Geometries Using 2D Data," EAGE 58th Conference and Technical Exhibition—Geophysical Division (B046), Jun. 3-7, 1996, 2 pages.
Sando, et al., "Experiences with a Super Wide 3D Marine Acquisition in the North Sea," EAGE 57th Conference and Technical Exhibition—EAEG Division (P039), May 29-Jun. 2, 1995, 2 pages.
Bordenave, et al., "Optimization of Shooting Scheme in Order to Reduce Infill on 3D Marine Surveys," Eage 57th Conference and Technical Exhibition—EAEG Division (P032), May 29-Jun. 2, 1995, 2 pages.
Bittleston, et al., "Marine Seismic Cable Steering and Control," EAGE 62nd Conference and Technical Exhibition (L-16), May 29-Jun. 2, 2000, 4 pages.
Thevenot, "Developments Streamer Tail Positioning," Eage (B047), 1991, pp. 196-197.
Franklin, et al., "Equipment handling and deck space management on seismic survey ships," First Break, vol. 7, No. 9, Sep. 1989, pp. 367-373.
Lucas, "A High Resolution Marine Seismic Survey," Geophysical Prospecting, 22, 1974, pp. 667-682.
DigiCOURSE, Model 5000 Operation and Maintenance Manual, Order No. 4200-016 (Manual Only); 4200-017 (Manual with Chek-Out Program), Revision B, Nov. 17, 1995, 138 pages.
Input/Output, Inc., System 3 (Version 4.00) User's Manual, Order No. 4200-036-400, Revision A, 1999, 319 pages.
Bearnth, et al., "Air Gun-Slant Cable Seismic Results in the Gulf of Mexico," SEG Abstracts, vol. 59 (SA 25), 1989, pp. 649-652.
Cramer, et al., "An innovative split-spread marine 3-D acquisition design for subsalt imaging," SEG Abstracts (SA3.3), Oct. 8-13, 1995, pp. 991-994.
Barr, "Seismic Data Acquisition: Recent Advances and the Road Ahead," Special Session 1: Recent Advances and the Road Ahead—Monday Afternoon, Sep. 27th (SS1.1), Sep. 26-30, 1993, pp. 1201-1204.
Cotton, et al., "Accuracy in Marine Streamer Positioning," SEG Abstracts (S9.3), 1985, pp. 434-436.
Maynard, et al., "Buoytrak: The State of the Art in Seismic Streamer Tracking," SEG Abstracts (S18.4), Nov. 2-6, 1986, pp. 642-643.
Conti, et al., "Towed Vehicle for Constant Depth and Bottom Contouring Operations," Offshore Technology Conference, Paper No. OTC 1456, 1971, pp. II 385-II 392.
Kaiser, et al., "Advanced Bin Coverage and Monitoring System for 3-D Marine Seismics," SEG Expanded Abstracts (MAR1.4), pp. 253-256.
Fagot, et al., "Deep-Towed Seismic System Design for Operation At Depths Up to 6000 M," 13th Annual OTC, OTC 4082, May 4-7, 1981, pp. 141-154.
Koterayama, et al., "Field Experiments on an Intelligent Towed Vehicle "Flying Fish— Proceedings of the Fifth International Offshore and Polar Engineering Conference, ISBN 1-880653-16-8 (Set); ISBN 1-880653-18-4 (vol. II),1995, pp. 287-291.
Vermeer, "Streamers versus Stationary Receivers," Offshore Technology Conference—OTC 8314, May 5-8, 1997, pp. 331-346.
Vallieres, et al., "Mini 3D for shallow gas reconnaissance," Offshore Technology Conference—OTC 7986, May 6-9, 1996, pp. 265-275.
Brink, et al., "Marine Acquisition Technique for Both Shallow and Deep Targets," SEG Annual Meeting (POS 1.6), Oct. 29-Nov. 2, 1989, pp. 405-407.
Amrine, et al., "Investigation of Interactions between Cable Leveling and Heading Measurement," SEG Annual Meeting (SA 2.2), Oct. 29-Nov. 2, 1989, pp. 640-642.
Kato, "Guidance and Control of Underwater Towed Vehicle Maneuverable in Both Vertical and Horizontal Axis," Proceedings of the Second International Offshore and Polar Engineering Conference, 1992, ISBN 1-880653-00-1 (Set); ISBN 1-880653-02-8 (vol. II), pp. 505-512.
Koterayama, et al., "A Numerical Study for Design of Depth, Pitch and Roll Control System of a Towed Vehicle," Proceedings of the Fourth International Offshore and Polar Engineering Conference, Apr. 10-15, 1994, ISBN/-880653-10-9 (Set); ISBN 1-880653-12-5 (vol. II), pp. 337-344.
Court, "Applications of Acoustics to Streamer/Source Positioning," SEG Technical Program Expanded Abstracts 1989 (SA 1.2), pp. 610-612.
International Search Report in Application No. PCT/IB99/01590 mailed Jan. 12, 2000.
International Preliminary Examination Report in Application No. PCT/IB99/01590 mailed Jan. 23, 2001, 11 pages.

(56) References Cited

OTHER PUBLICATIONS

Partial European Search Report in Application No. 07113028 mailed May 27, 2010, 4 pages.
Extended European Search Report in Application No. 07113028 mailed Aug. 19, 2010, 5 pages.
Extended European Search Report in Application No. 11168257.1 mailed Mar. 27, 2013, 14 pages.
Camacho, et al., "Model Predictive Control in the Process Industry," Advances in Industrial Control, 1995, pp. 3-4, 9-10, and 62.
Maybeck, "Stochastic Models, Estimation and Control: vol. 1," Mathematics in Science and Engineering vol. 141, 1979, pp. 1-16.

* cited by examiner

METHODS FOR GATHERING MARINE GEOPHYSICAL DATA

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The invention relates generally to the field of marine geophysical surveying. More particularly, the invention relates to methods for controlling the spatial distribution or geophysical data gathering equipment towed behind a survey vessel.

2. Background Art

Marine geophysical surveying systems such as seismic acquisition systems and electromagnetic survey systems are used to acquire geophysical data from formations disposed below the bottom of a body of water, such as a lake or the ocean. Marine seismic surveying systems, for example, typically include a seismic survey vessel having onboard navigation, seismic energy source control, and geophysical data recording equipment. The seismic survey vessel is typically configured to tow one, or more typically a plurality of laterally spaced apart sensor streamers through the water. At selected times, the seismic energy source control equipment causes one or more seismic energy sources (which may be towed in the water by the seismic vessel or by another vessel) to actuate. Signals generated by various sensors on the one or more streamers in response to detected seismic energy are ultimately conducted to the recording equipment. A record with respect to time is made in the recording system of the signals generated by each sensor (or groups of such sensors). The recorded signals are later interpreted to infer the structure and composition of the formations below the bottom of the body of water. Corresponding components for inducing electromagnetic fields and detecting electromagnetic phenomena originating in the subsurface in response to such imparted fields may be used in marine electromagnetic geophysical survey systems.

The one or more sensor streamers are in the most general sense long cables that have geophysical sensors disposed at spaced apart positions along the length of the cables. A typical streamer can extend behind the geophysical survey vessel for several kilometers.

Multiple streamer systems are used in what are known as three dimensional and four dimensional geophysical surveys. A four dimensional seismic survey is a three dimensional survey over a same area of the Earth's subsurface repeated at selected times.

The quality of geophysical images of the Earth's subsurface produced from three dimensional or four dimensional surveys is affected by how well the positions of the individual sensors on the streamers are controlled. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions.

U.S. Pat. No. 6,011,752 issued to Ambs et al. describes a seismic streamer position control module.

U.S. Pat. No. 6,144,342 issued to Bertheas et al. describes a method for controlling the navigation of a towed seismic streamer using "birds" affixable to the exterior of the streamer.

SUMMARY OF THE INVENTION

In a first embodiment the invention comprises a method for gathering geophysical data, including towing geophysical data gathering equipment behind a survey vessel in a body of water, said equipment including an array of sensor streamers extending behind said vessel, and determining a geodetic location of a streamer steering reference point at a forward end of said sensor streamers and a reference direction. At least one sensor streamer included in said array of sensor streamers is laterally deflected in response to the determined geodetic location of said streamer steering reference point and said determined reference direction.

In another embodiment the invention comprises a method for gathering geophysical data, including towing geophysical data gathering equipment behind a survey vessel in a body of water, said equipment including an array of sensor streamers comprising a plurality of sensor streamer extending behind said vessel, determining a geodetic location of a vessel steering reference point at a forward end of said array of sensor streamers, and steering the survey vessel so that the vessel steering reference point follows a preselected travel path.

In yet another embodiment the invention comprises a method for gathering geophysical data, including towing geophysical data gathering equipment behind a survey vessel in a body of water, said equipment including a geophysical source and an array of sensor streamers including a plurality of sensor streamer extending behind the vessel, determining a geodetic location of a source steering reference point at a forward end of said array of sensor streamers, determining a desired source lateral position with reference to the source steering reference point, and steering said geophysical source so that said geophysical source follows the desired source lateral position.

Other aspects and advantages of the invention will be apparent from the following description and the appended claims.

DETAILED DESCRIPTION

Figure 1:
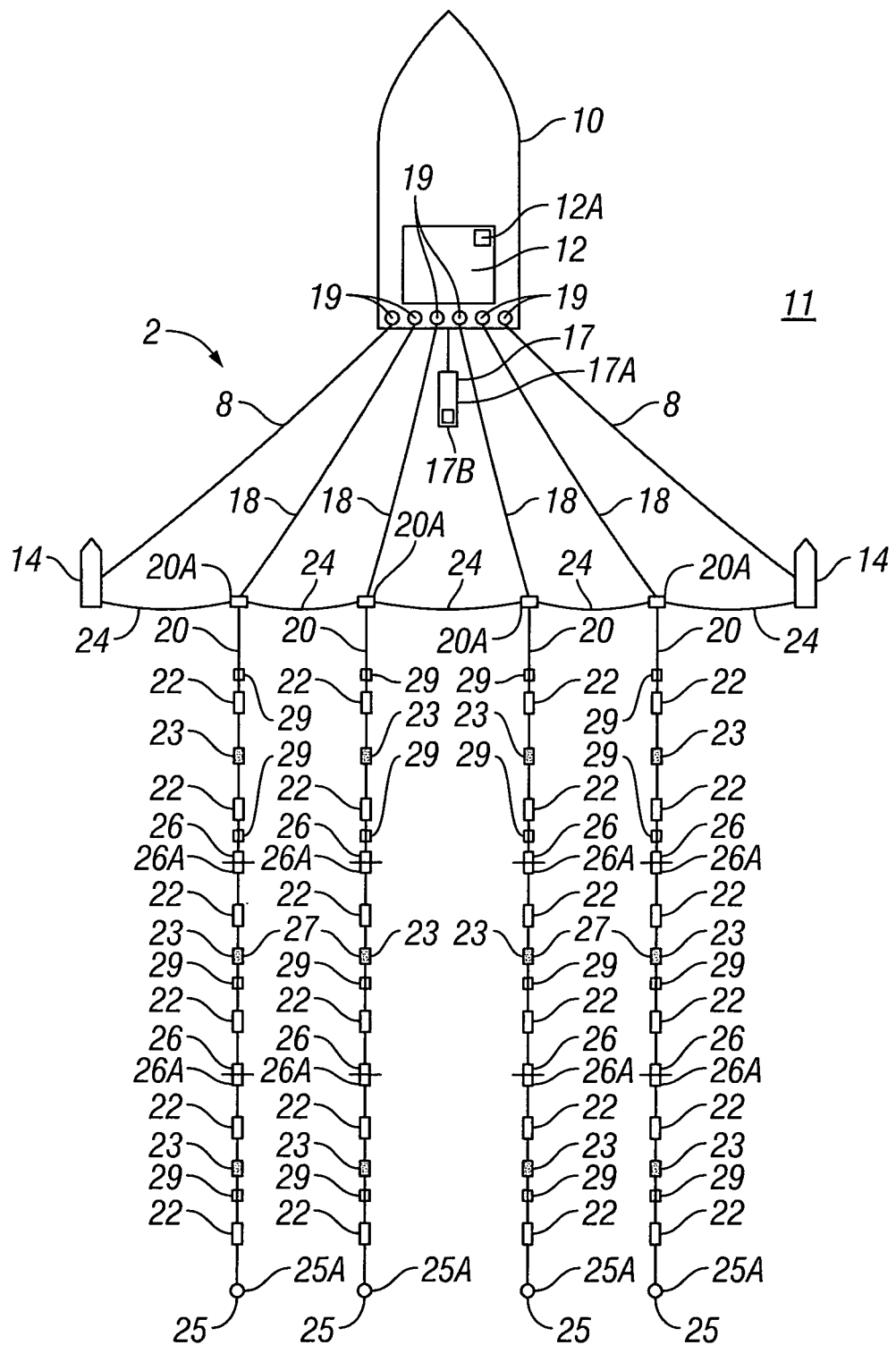
FIG. 1 shows an array of seismic streamers each including lateral force and depth control devices for adjusting geometry of the respective streamer.

FIG. 1 shows a typical marine geophysical survey system 2 that can include a plurality of geophysical sensor streamers 20. Each of the sensor streamers can be guided through the water by one or more lateral force and depth ("LFD") control devices 26 cooperatively engaged with each of the streamers 20. As will be explained further below, the use of LFD control devices 26 which can provide depth control capability, is a matter of choice for the system designer. It is only necessary for purposes of the invention that the devices associated with the geophysical sensor streamers provide directional control to affect the direction of the streamer parallel to the plane of the water surface as the streamer moves through a body of water.

The geophysical survey system 2 includes a survey vessel 10 that moves along the surface of a body of water 11 such as a lake or the ocean. The survey vessel 10 may include thereon equipment, shown generally at 12 and for convenience collectively referred to as a "recording system." The recording system 12 typically includes devices (none of the following described devices shown separately) such as a data recording unit for making a record with respect to time of signals generated by various sensors in the acquisition system. The recording system 12 also typically includes navigation equipment to determine and record, at selected times, the geodetic position of the vessel 10, and using other devices to be explained below, the geodetic position each of a plurality of geophysical sensors 22 disposed at spaced apart locations on streamers 20 towed by the survey vessel 10.

In one example, the device for determining the geodetic position may be a geodetic position signal receiver such as a global positioning satellite ("GPS") receiver, shown schematically at 12A. Other geodetic position determination devices are known in the art. The foregoing elements of the recording system 12 are familiar to those skilled in the art, and with the exception of the geodetic position detecting receiver 12A, are not shown separately in the figures herein for clarity of the illustration.

The geophysical sensors 22 can be any type of geophysical sensor known in the art. Non-limiting examples of such sensors may include particle motion-responsive seismic sensors such as geophones and accelerometers, pressure-responsive seismic sensors, pressure time gradient-responsive seismic sensors, electrodes, magnetometers, temperature sensors or combinations of the foregoing. The geophysical sensors 22 may measure, for example, seismic or electromagnetic field energy primarily reflected from or refracted by various structures in the Earth's subsurface below the bottom of the water 11 in response to energy imparted into the subsurface by an energy source 17. The energy source 17 may be, for example a seismic energy source or an array of such sources. Non-limiting examples of seismic energy sources include air guns and water guns. The energy source 17 may also be an electromagnetic source, for example, a wire loop or electrode pair (not shown for clarity). The energy source 17 may be towed in the water 11 by the survey vessel 10 as shown or a different vessel (not shown). The recording system 12 may also include energy source control equipment (not shown separately) for selectively operating the energy source 17.

In the survey system shown in FIG. 1, there are four sensor streamers 20 towed by the survey vessel 10. The number of sensor streamers shown in FIG. 1, however, is only for purposes of explaining the invention and is not a limitation on the number of streamers that may be used in any particular geophysical survey system according to the invention. In marine geophysical acquisition systems such as shown in FIG. 1 that include a plurality of laterally spaced apart streamers, the streamers 20 are typically coupled to towing equipment that is intended to secure the forward end of each of the streamers 20 at a selected lateral position with respect to adjacent streamers and with respect to the survey vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14.

The paravanes 14 are each shaped to provide a lateral component of motion to the various towing components deployed in the water 11 when the paravanes 14 are moved through the water 11. "Lateral" in the present context means transverse to the direction of motion of the survey vessel 10 in the water 11. The lateral motion component of each paravane 14 is opposed to that of the other paravane 14. The combined lateral motion component of the paravanes 14 separates the paravanes 14 from each other until they put into tension one or more spreader ropes or cables 24, functionally coupled end to end between the paravanes 14.

The sensor streamers 20 can each be coupled, at the axial end thereof nearest the vessel 10 (the "forward end"), to a respective lead-in cable termination 20A. The lead-in cable terminations 20A can be coupled to or associated with the spreader ropes or cables 24 so as to substantially fix the lateral positions of the streamers 20 with respect to each other. The lead-in cable terminations 20A may each include a relative position signal sensor (not shown separately, and explained further below). Electrical and/or optical connection between the appropriate components in the recording system 12 and, ultimately, the geophysical sensors 22 (and/or other circuitry) in the streamers 20 may be made using lead-in cables 18, each of which terminates in a respective lead-in cable termination 20A. One of the lead-in terminations 20A is disposed at the forward end of each streamer 20. Each of the lead-in cables 18 may be deployed by a respective winch 19 or similar spooling device such that the deployed length of each cable 18 can be changed. The type of towing equipment coupled to the forward end of each streamer shown in FIG. 1 is only intended to illustrate a type of equipment that can tow an array of laterally spaced apart streamers in the water. Other towing structures may be used in other examples of geophysical acquisition system according to the invention.

The acquisition system shown in FIG. 1 can also include a plurality of lateral force and depth ("LFD") control devices 26 cooperatively engaged with each of the streamers 20 at selected positions along each streamer 20. Each LFD control device 26 can include one or more rotatable control surfaces (not shown separately) that when moved to a selected rotary orientation with respect to the direction of movement of such surfaces through the water 11 creates a hydrodynamic lift in a selected direction to urge the streamer 20 in any selected direction upward or downward in the water 11 or laterally along the water surface with respect to the direction of motion of the vessel 10. Thus, such LFD control devices 26 can be used to maintain the streamers 20 in a selected geometric arrangement. A non-limiting example of LFD control device that may be used in some examples is described in U.S. Patent Application Publication No. 2009/0003129 filed by Stokkeland et al., the underlying patent application for which is commonly owned with the present invention. The particular configuration of the LFD control devices 26, however, is not a limit on the scope of the present invention. As previously explained, for purposes of the present invention it is only necessary for any devices used as the LFD control devices 26 be able to apply a selectable lateral force to the associated streamers 20. Depth control of the streamers 20 may be provided passively, such as by providing the streamers 20 with a selected overall specific gravity, or by separate depth control devices (not shown). Therefore, any reference to "depth" control as provided by the LFD control devices 26 is only intended to cover the present example implementation, such as using the device shown in the Stokkeland et al. '129 patent application publication referred to above. Any reference to active depth control of the streamers 20 is not a limit on the scope of the present invention. For purposes of defining the scope of the invention, therefore, the LFD control devices 26 need only perform the function of "lateral force" control devices, and the inclusion of depth control as a part of the function of the LFD control devices 26 explained herein is intended to ensure that those of ordinary skill in the art understand that the use of the example LFD control devices 26 disclosed herein, and any other similar examples, are within the scope of the present invention.

In the present example, each LFD control device 26 may include an associated relative position determination device. In one example, the position determination device may be an acoustic range sensing device ("ARD") 26A. Such ARDs typically include an ultrasonic transceiver or transmitter and electronic circuitry configured to cause the transceiver to emit pulses of acoustic energy. Travel time of the acoustic energy between a transmitter and a receiver disposed at a spaced apart position such as along the same streamer and/or on a different streamer, is related to the distance between the transmitter and a receiver, and the acoustic velocity of the water. The acoustic velocity can be assumed substantially not to change during a survey, or it can be measured by a device such as a water velocity test cell. Alternatively or additionally, acoustic range sensing devices ("ARDs") may be disposed at selected positions along each one of the streamers not collocated with the LFD control devices 26. Such additional ARDs are shown at 23 in FIG. 1. Each of the ARDs 26A, 23 may be in signal communication with the recording system 12 such that at any moment in time the distance between any two ARDs 26A, 23 on any of the streamers 20 is determinable. One or more ARDs may be placed at selected positions proximate the aft end of the vessel 10 so that relative distances between the selected positions on the vessel 10 and any of the ARDs on the streamers may also be determined. A non-limiting example of an ARD and a system used with such ARDs is described in U.S. Pat. No. 7,376,045 issued to Falkenberg et al. and assigned to the assignee of the present invention and incorporated herein by reference.

The streamers 20 may additionally or alternatively include a plurality of heading sensors 29 disposed at spaced apart positions along each streamer 20. The heading sensors 29 may be geomagnetic direction sensors such as magnetic compass devices affixed to the exterior of the streamer 20. One type of compass device is described in U.S. Pat. No. 4,481,611 issued to Burrage and incorporated herein by reference. The heading sensors 29 provide a signal indicative of the heading (direction with respect to magnetic north) of the streamer 20 at the axial position of the heading sensor 29 along the respective streamer. Measurements of such heading at spaced apart locations along each streamer may be used to interpolate the geometry (spatial distribution) of each streamer.

Each streamer 20 may include at the distal end thereof a tail buoy 25. The tail buoy 25 may include, among other sensing devices, a geodetic position receiver 25A such as a GPS receiver that can determine the geodetic position of each tail buoy 25. The geodetic position receiver 25A in each tail buoy 25 may be in signal communication with the recording system 12.

By determining the distance between ARDs 26A, 23, including the one or more ARDs on the vessel 10, and/or by interpolating the spatial distribution of the streamers 20 from the heading sensor 29 measurements, an estimate of the geometry of each streamer 20 may be made. Collectively, the geometry of the streamers 20 may be referred to as the "array geometry." For purposes of defining the scope of the present invention, the various position measurement components described above, including those from the heading sensors 29, from the ARDs 26A, 23, and, if used, from the additional geodetic position receivers 25A in the tail buoys 25, may be used individually or in any combination. It is only necessary for purposes of the present invention to be able to reasonably estimate the relative position of each point along each streamer 20 with reference to a geodetic position measurement at one or more points in the survey system. One such point may be on the survey vessel 10, as measured by the GPS geodetic position receiver 12A, and/or the GPS geodetic position receivers 25A in the tail buoys 25.

By appropriate selection of the positions along each streamer at which the various relative position measurement devices described above are disposed, it is possible to determine the array geometry without the need to measure, estimate or otherwise determine the absolute geodetic position at large numbers of positions along each streamer, such as by using a large number of GPS receivers. The ARDs 26A, 23 and heading sensors 29 may be referred to for convenience in defining the invention as "relative position determination" sensors. By determining relative positions at each point along each streamer with reference to a selected point on the survey vessel, streamer tail buoy 25 and/or the energy source 17, (the geodetic position of which is measured by the respective sensor thereon) is it possible to determine the geodetic position of each such streamer point. A particular example of a system for determining relative positions of the streamers using acoustic signals is described in the Falkenberg et al. patent referred to above.

In the present example, the energy source 17 may include a steering device 17B to enable separate control of the trajectory of the source 17. The energy source steering device 17B may be controlled by suitable control signals from the recording system 12.

During operation of the geophysical acquisition system shown in FIG. 1, it may be desirable to adjust the streamer array geometry in order to achieve or maintain a selected array geometry during geophysical surveying. The recording system 12 may be configured to send suitable control signals to each of the LFD control devices 26 to move associated portions of each streamer 20 laterally.

During geophysical survey operations, it is often desirable for the streamers 20 to spread out behind the vessel 10 in a selected geometry. In one implementation of the invention it may be desirable for the streamers to spread evenly behind the vessel to avoid "holes" in the coverage of measurements of the subsurface. However, other selected geometries may also be chosen. "Evenly" in the present context means that the lateral spacing between adjacent streamers 20 is the same along the length of the streamers 20, or the lateral spacing is related, e.g., proportional, to the distance along the streamers from the forward ends thereof. Deviations from even spreading may result from, for example, rip currents in the water 11 and propeller wash from the vessel 10.

1. Streamer Front End Follow Mode.

Figure 2:
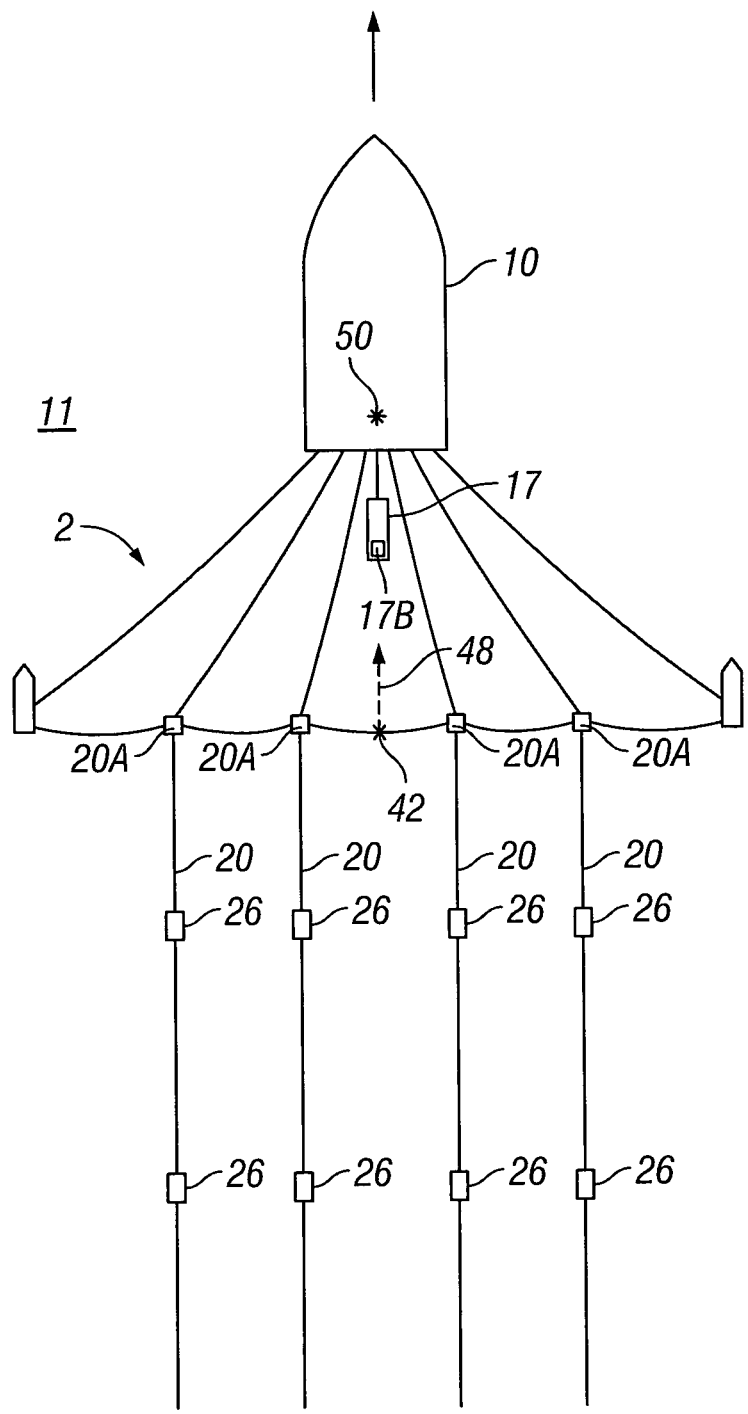
FIG. 2 illustrates the streamer front follow mode embodiment of the invention.

A first embodiment of the invention may be referred to as a "streamer front end follow mode." With reference to FIG. 2, geophysical data gathering equipment 2, including an array of sensor streamers 20, is towed behind a survey vessel 10 in a body of water 11. In this embodiment the geodetic position of a streamer steering reference point 42 at the forward end of the sensor streamers 20 is determined and a reference direction 48 of said streamer steering reference point 42 is determined. The sensor streamers 20 are then controlled by means of LFD control devices 26 in response to signals from the recording system (12 in FIG. 1) so that the sensor streamers 20 seek to follow a geometry defined relative to said reference point and reference direction. At least one sensor streamer included in said array of sensor streamers 20 is deflected laterally in response to said determined geodetic location of said streamer steering reference point 42 and the determined reference direction 48.

A geodetic position of the forward end of one or more of the sensor streamers 20 may be determined by using the relative position sensor (not shown separately) in the forward end terminations 20A of the sensor streamers and calculating the geodetic position of the forward ends of the sensor streamers from the measured relative position between the forward end termination 20A and one or more of the geodetic position sensor measurements (e.g., at 12A in FIGS. 1, 17A in FIG. 1 or 25A in FIG. 1). The geodetic positions thus calculated at the front end termination 20A may be used to define a streamer steering reference point 42. The streamer steering reference point 42, for example, may be in the lateral center of the front end terminations 20A. The reference point 42 may be determined, for example, by calculating an average of the geodetic positions of all the front end terminations 20A. The streamer steering reference point could also be based on one or a limited number of the streamer front end terminations 20A only, plus possibly a lateral offset. For example the streamer steering reference point may be based on two of the sensor streamers front end terminations 20A.

In addition to the streamer steering reference point, a "reference direction" 48 is determined. In one implementation of the invention the reference direction 48 may be the direction of movement of the streamer steering reference point 42 as sensor streamers 20 are towed behind survey vessel 10. To determine this reference direction, the geodetic position of the streamer steering reference point 42 may be determined repeatedly at selected time intervals (e.g., every second) to calculate a direction of travel of the streamer steering reference point 42. The streamer steering reference points may be subjected to a smoothing filter (e.g., in the recording system 12 in FIG. 1) to remove any short term noise or variations. In another implementation of the invention, the reference direction 48 may be the direction between the geodetic location of said streamer steering reference point 42 and a location 50 on said survey vessel 10 or another location in said geophysical equipment 2. A time filtered version of the reference direction 48 derived by determining the direction between the geodetic location of said streamer steering reference point 42 and a location 50 on said geophysical equipment 2 may also be used. There may also be other suitable ways of defining the reference direction. The reference direction may also be a preselected direction. The streamer steering reference point 42 and the reference direction 48 may then be utilized to determine a desired location for said sensor streamers 20. A possible desired travel path is for each of the sensor streamers 20 to follow the reference point and reference direction 48, but offset from reference point by a selected offset for each streamer or selected portions of each streamer. In the present example, a lateral offset perpendicular to the reference direction 48 may be defined for each LFD control device 26 on each streamer 20, and a final preferred position for each LFD control device 26 may be defined by the reference point 42 plus the lateral offset. The lateral offset may be calculated individually for each LFD control device, and is typically, but not necessarily, dependent on the distance of each such device from the vessel 10 as well as the respective streamer's nominal lateral offset from the vessel center line. Other factors for setting the offset could be sideways current. In cases with strong sideways currents, it might not be desirable to try to fully correct for the skew of the towing arrangement, but rather add some offset on all streamers in the direction of the current to compensate for the skew. The selected sensor geometry may be a straight line that is parallel with or at an angle to the reference direction 48, but may not be a straight line.

In one implementation of this embodiment of the invention, the streamer steering reference point is the forward end of one of said sensor streamers included in said array of sensor streamers. In a further implementation of the invention a geodetic location of a second streamer reference point of a forward end of a second one of the sensor streamers is determined, and said second streamer is laterally deflected in response to the determined geodetic location of the second streamer steering reference point for said second streamer steering reference point.

A desired position for each LFD control device 26 can be defined according to the techniques explained above, and the LFD control devices 26 can be operated such that the streamers 20 substantially travel to follow such desired position.

2. Vessel Steering to Keep Streamer Front Ends on a Determined Path.

Figure 3:
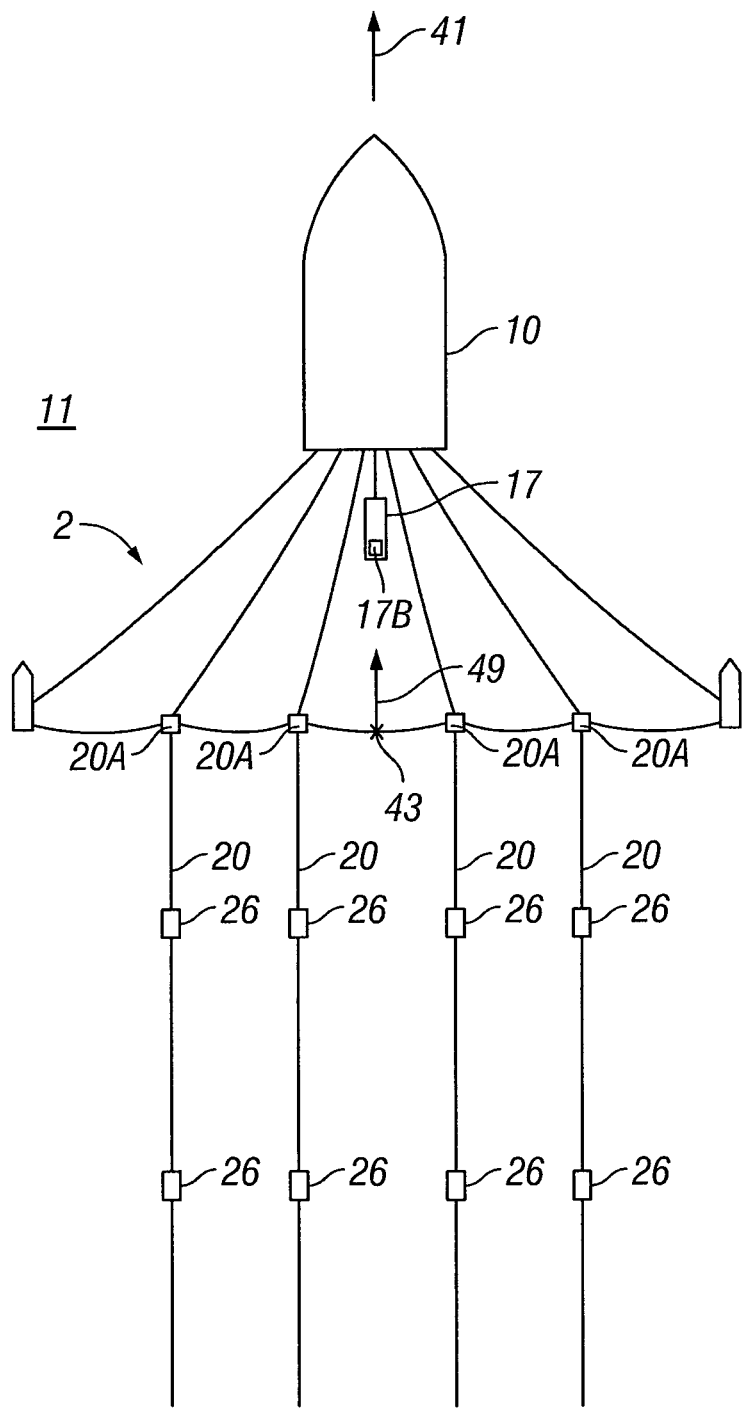
FIG. 3 illustrates the vessel steering to keep streamer front end on a determined path embodiment of the invention.

Another embodiment of the invention may be referred to as vessel steering to keep streamer front end on a determined path 49. With reference to FIG. 3, geophysical data gathering equipment 2, including an array of sensor streamers 20, is towed behind a survey vessel 10 in a body of water 11. In this embodiment of the invention, the vessel heading 41 may be adjusted to cause a vessel steering reference point 43 at a forward end of said array of sensor streamers 20 to follow a determined geodetic path 49, for example, along a path traversed by the forward end of an array of sensor streamers in a previously conducted geophysical survey. A geodetic location of a vessel steering reference point 43 at a forward end of the array of sensor streamers 20 is determined. In one implementation of the invention, the vessel steering reference point 43 may be the same as the streamer steering reference point 42. The survey vessel 10 is steered so that the vessel steering reference point 43 follows the preselected path 49. The vessel steering will typically take into account wind and water current measurements to improve the accuracy of the vessel steering to better achieve the desired streamer front end steering. Steering a geophysical sensor array as explained above may provide certain advantages. By selecting a vessel heading 41 such that the reference point 43 follows a selected trajectory, the amount of deflecting force required proximate the forward end of each of the streamers, provided by LFD control devices 26, to maintain the array of sensor streamers 20 in a selected geometry may be substantially reduced.

3. Energy Source Follow Mode.

Figure 4:
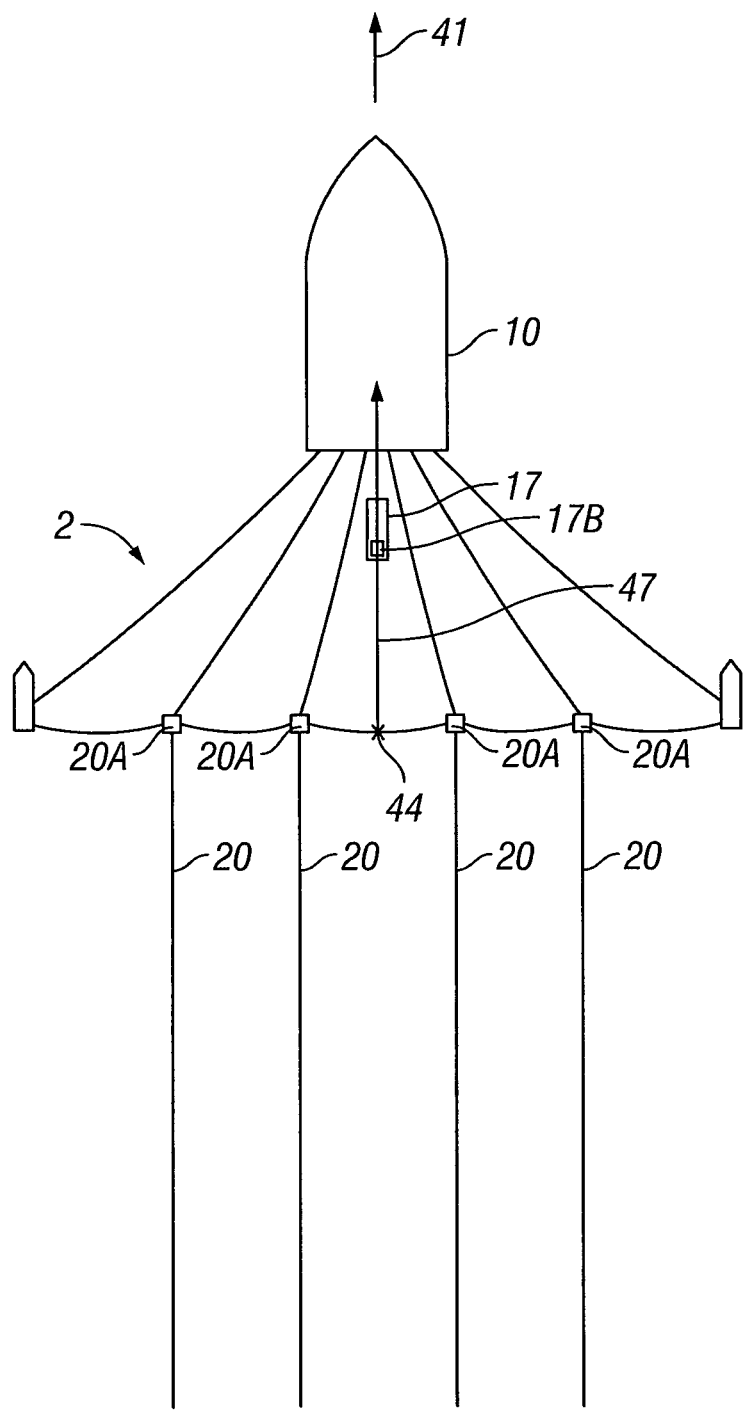
FIG. 4 illustrates the energy source follow mode embodiment of the invention.

Another embodiment of the invention may be referred to as an energy source follow mode. With reference to FIG. 4, geophysical data gathering equipment 2, including an array of sensor streamers 20, is towed behind a survey vessel 10 in a body of water 11. In this embodiment of the invention, the energy source steering device 17B may be operated to cause the energy source 17 to move towards a lateral position which may be on a line 47 projected forward from a forward end of said array of sensor streamers 20. In a particular implementation of the invention, the source steering reference point 44 is the same as streamer steering reference point 42. A desired source lateral position may be defined by extending a line 47 forward from source steering reference point 44. Line 47 may be determined in the same manner that reference direction 48 is determined as described above in the discussion of the Streamer Front End Follow mode, by determining a direction of movement of source steering reference point 44 or the direction from source steering reference point 44 to a location on said survey vessel 10 or another location in said geophysical equipment 2. Line 47 may also be determined from a preselected reference direction. In a particular implementation of the invention, line 47 is the same as the reference point and reference direction defined with reference to the streamer front end follow mode described with reference to FIG. 2. Typically, a seismic source will include an array of individual source elements or subarrays, and a center position of the source is steered to follow the determined lateral position defined by the line 47. The desired source center position can be used to define a desired offset position for each individual source element or subarray with respect to the projected source line 47.

Methods for operating LFD control devices and controlling geometry of a sensor array according to the various aspects of the invention may provide more even coverage in marine geophysical surveying, may provide more accurate positioning of geophysical sensors, and may improve safety of the array in hostile environments. Any of the above methods (the Steamer Front End Follow Mode, the Vessel Steering to keep streamer front ends on a determined path and the Energy Source Follow Mode) may be used alone or in any combination of two or three of these modes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for gathering geophysical data, comprising:
   towing geophysical data gathering equipment behind a survey vessel in a body of water, the equipment including at least one geophysical source and an array of sensor streamers extending behind the vessel;
   determining a geodetic location of a first steering reference point at a forward end of the sensor streamers;
   determining a reference direction based on the first steering reference point and a selected location on the survey vessel; and
   laterally deflecting both at least one sensor streamer included in the array of sensor streamers and the at least one geophysical source, wherein the laterally deflecting is based on the determined geodetic location of the first steering reference point and the determined reference direction.

2. The method of claim 1, further comprising determining a desired source lateral position with reference to the first steering reference point and steering the geophysical source so that the geophysical source follows the desired source lateral position.

3. The method of claim 1, further comprising steering the survey vessel so that the first steering reference point follows a preselected travel path.

4. The method of any of claims 1,2 or 3, wherein the first steering reference point is the forward end of a particular one of the sensor streamers included in the array of sensor streamers.

5. The method of claim 4, further comprising determining a geodetic location of a second steering reference point, the second steering reference point being the forward end of a second one of the sensor streamers included in the array of sensor streamers and laterally deflecting the second streamer in response to the determined geodetic location of the second steering reference point and the determined reference direction.

6. The method of any of claim 1, 2, or 3, wherein determining the geodetic position of the first steering reference point comprises determining a geodetic position of a forward end of at least two sensor streamers included in the array of sensor streamers, and determining the first steering reference point with respect to the determined geodetic positions of the forward ends of the at least two sensor streamers.

7. The method of any of claims 1, 2, or 3, wherein determining the reference direction comprises successively determining the geodetic position of the first steering reference point and determining the reference direction from the successive determinations of the geodetic position of the first steering reference point.

8. The method of claim 7, further comprising time filtering the determined reference direction.

9. The method of any of claims 1, 2, or 3, wherein determining the reference direction comprises utilizing a preselected direction.

10. The method of any of claim 1, 2, or 3, wherein laterally deflecting the at least one sensor streamer includes laterally deflecting the at least one sensor streamer toward a reference line, the reference line passing through the first steering reference point along the reference direction.

11. The method of any of claim 1, 2, or 3, wherein determining the reference direction comprises measuring a direction between the first steering reference point and a selected location on the geophysical data gathering equipment.

12. A system, comprising:
    at least one geophysical source and an array of streamers towable behind a survey vessel in a body of water; and
    control equipment configured to:
      determine a location of a first steering reference point at a forward end of the array of streamers;
      determine a reference direction based on the first steering reference point and a selected location on the survey vessel;
      laterally deflect both a selected streamer from the array of streamers and the at least one geophysical source based on the determined location of the first steering reference point and the determined reference direction.

13. The system of claim 12, wherein laterally deflecting the selected streamer includes laterally deflecting the selected streamer toward a reference line, the reference line passing through the first steering reference point along the determined reference direction.

14. The system of claim 12, wherein the control equipment is further configured to steer the survey vessel such that the first steering reference point follows a selected path.

15. The system of claim 12, wherein the equipment is further configured to determine a plurality of steering reference points, the plurality of steering reference points being located at forward ends of a corresponding plurality of streamers from the array of streamers.

* * * * *